United States Patent [19]
Yoshimoto et al.

[11] Patent Number: 4,996,015
[45] Date of Patent: Feb. 26, 1991

[54] METHODS OF PRODUCING CERAMIC HONEYCOMB STRUCTURES

[75] Inventors: Masafumi Yoshimoto, Sakai; Tadao Nakatsuji, Kashibacho; Noriaki Sato, Takaishi, all of Japan

[73] Assignee: Sakai Chemical Industry Co., Ltd., Osaka, Japan

[21] Appl. No.: 353,328

[22] Filed: May 16, 1989

[30] Foreign Application Priority Data

May 20, 1988 [JP] Japan .................................. 63-124756

[51] Int. Cl.⁵ .............................................. B29C 47/00
[52] U.S. Cl. .................................. 264/177.11; 264/63; 264/177.12
[58] Field of Search .................. 264/63, 177.11, 177.12

[56] References Cited
U.S. PATENT DOCUMENTS 3,963,504  6/1976  Lundsager ............................ 264/63
4,579,707  4/1986  Kobayashi et al. ................... 264/63

Primary Examiner—James Derrington
Attorney, Agent, or Firm—Wenderoth, Lind & Ponack

[57] ABSTRACT

A method of producing ceramic honeycomb structures which comprises: the first step of preparing a ceramic plastic composition which comprises admixing and kneading a ceramic material with water, a polyalkylene glycol monoether and an organic binder; the second step of extruding the ceramic plastic composition into a wet green mold of a honeycomb structure having openings extending therethrough; the third step of passing a high humidity air through the openings to evaporate the substantial amount of the water in the green mold; the fourth step of passing heated air to evaporate the substantial amount of the polyalkylene glycol monoether from the green mold; and the fifth step of calcining the mold.

The method is suitably applicable to the production of ceramic honeycomb structures as a catalyst structure or a catalyst carrier structure therefor which contains a material acting as an oxidation catalyst.

4 Claims, No Drawings

METHODS OF PRODUCING CERAMIC HONEYCOMB STRUCTURES

This invention relates to a method of producing ceramic honeycomb structures suitable for use as a denitrizing catalyst structure or a carrier structure therefor.

Calcined ceramic structures in the form of honeycomb which have openings extending therethrough in a fixed direction are in wide use as denitrizing catalysts among others to catalytically reduce nitrogen oxides in waste gases or catalyst carrier structures therefor.

Such a ceramic honeycomb structure as a catalyst structure or a carrier structure therefor has been hitherto produced exemplarily by kneading a ceramic material which contains a catalyst material and a carrier material together with water and an organic binder, to provide a moldable ceramic plastic composition, extruding the plastic composition into a wet green honeycomb mold, and then drying and calcining the mold to provide a honeycomb catalyst structure. In this prior method, a catalyst material and a carrier material may also be a ceramic material, or at least one of the ceramic materials used.

When desired, a ceramic plastic composition which contains a carrier material is first formed into a honeycomb structure, and then a catalyst material is supported thereon. As a further method, a precursor of a catalyst material and, if necessary of a carrier material are added to an inactive ceramic material, and a honeycomb structure is produced, which is then calcined to provide a honeycomb catalyst structure.

However, in the production of a large-sized ceramic honeycomb structure which has many openings formed with thin walls by these prior methods, there has been a tendency that the wall becomes fissured or is chipped when a green mold is dried or calcined. Sometimes, the resultant structure is broken. Thus the prior methods are very low in yield and productivity.

As already known, it is necessary, for the production of a ceramic honeycomb structure without such structural defects as above mentioned in high yields, that (a) a plastic composition is extruded into a green mold uniform in the extrusion direction and a direction perpendicular thereto in a molding step; (b) the resultant mold is dried uniformly in the extrusion direction and a direction perpendicular thereto in a drying step; and (c) organic materials contained in the mold are prevented from combustion in a calcining step so that the mold has a uniform temperature distribution therein.

Therefore, there have been proposed improvements from the structural standpoint of dies for extruding a ceramic plastic composition into a honeycomb structure with regard to the above mentioned molding step (a). Further, there have been proposed a method with regard to the above drying step (b) in which a wet green mold is left standing over a long period of time under an atmosphere of a relative humidity of almost 100% to very gradually evaporate the water contained in the mold, thereby to prevent the occurrence of structural distortion in the mold. However, this method needs much time for drying a mold, and is very low in productivity. Thus the method is substantially inapplicable to industrial production of large-sized ceramic honeycomb structures.

Therefore, a further method has been proposed in which a ceramic plastic composition containing polyhydric alcohols such as glycerine, ethylene glycol or propylene glycol together with water is extruded into a wet honeycomb structure, and the structure is stepwise dried in a specific manner, as described in Japanese Patent Publication No. 60-34510.

In this prior method, a relatively low temperature air is first passed through the openings of the wet honeycomb mold so that most of the water contained in the mold evaporates, but substantially no polyhydric alcohol evaporates, and then a high temperature air is passed through the openings to evaporate the polyhydric alcohol.

According to the method, a relatively low temperature air such as room temperature is first used to evaporate the water in a controlled manner so that no structural distortion takes place in the honeycomb structure in the step of water removal. However, since the polyhydric alcohol has a very low vapor pressure, a high temperature air must be used to evaporate the polyhydric alcohol from the wet mold in the next step. Therefore, when the honeycomb structure contains a material which functions as an oxidation catalyst, the polyhydric alcohol is catalytically burnt to sinter the honeycomb structure and deteriorate porous structure of the honeycomb structure, or to produce a wide temperature distribution in the honeycomb structure so that the honeycomb contracts remarkably in part and is destroyed.

It is possible to prevent sintering or destruction of honeycomb structures if the polyhydric alcohol is very gradually evaporated, but this needs much time. On the other hand, when the wet mold is dried insufficiently, a large amount of the polyhydric alcohol remains in the honeycomb structure, so that it is rapidly evaporated from the mold when the mold is calcined at high temperatures, and it may happen that walls are damaged or the honeycomb structure is destroyed when the honeycomb structure is calcined.

It is, therefore, an object of the invention to provide a method of producing ceramic honeycomb structures without the attendance of cracking, chipping or destruction of walls of honeycomb structures or honeycom structures themselves in high yield and productivity, using a ceramic plastic composition which contains a material acting as an oxidation catalyst to accelerate the combustion of organic materials contained in the composition.

In accordance with the invention, there is provided a method of producing ceramic honeycomb structures which comprises:

(a) the first step of preparing a ceramic plastic composition which comprises admixing and kneading a ceramic material and an organic binder with water in amounts of about 85–50% by weight and a polyalkylene glycol monoether selected from the group consisting of diethylene glycol monoether and triethylene glycol monoether in amounts of about 15–50% by weight based on the total of the water and the polyalkylene glycol monoether, respectively;

(b) the second step of extruding the ceramic plastic composition into a wet green mold of a honeycomb structure having openings extending therethrough;

(c) the third step of passing air of about 90–70% in relative humidity through the openings to evaporate the substantial amount of the water in the green mold;

(d) the fourth step of passing air of temperatures sufficient to evaporate the alkylene glycol monoether from the green mold to provide a dried mold; and (e) the fifth step of calcining the dried mold.

In the first step of the method of the invention, a ceramic material such as titanium dioxide and an organic binder are admixed and kneaded together with water in amounts of about 85-50% by weight and a polyalkylene glycol monoether selected from the group consisting of diethylene glycol monoether and triethylene glycol monoether in amounts of about 15-50% by weight based on the total of the water and the polyalkylene glycol monoether, respectively, to prepare a moldable ceramic plastic composition.

The method of the invention is suitably applicable to the production of a ceramic honeycomb structure using a ceramic composition which contains a material acting as an oxidation catalyst to accelerate the combustion of an organic material.

In this regard, a denitrizing catalyst is produced by using a catalyst material, which may be a ceramic material itself or one of the ceramic materials used. For instance, a denitrizing catalyst which is used to catalytically reduce nitrogen oxides contained in waste gases using ammonia as a reducing agent usually cointains one or more of vanadium pentoxide, cupric oxide, ferric oxide, tungsten trioxide, molybdenum trioxide, coblatous oxide, chromium oxide and nickelous oxide as preferred catalyst materials. All of these oxides act as an oxidation catalyst as well. However, many other oxides are known as catalyst materials to reduce nitrogen oxides, and herein the specification, catalyst materials for denitrizing catalysts are not limited to those exemplified above when denitrizing catalysts are referred to. These metal oxides are used as particles preferably of about 1-50 $\mu$m in average particle size in the invention.

The carrier material used is selected depending upon a catalyst material used. The carrier material may also be a ceramic material. When such a denitrizing catalyst as above described is produced, titanium dioxide, alumina, zirconium oxide or the like is preferred as a carrier material. However, the carrier material used is not limited thereto. It is preferred that the carrier material is also of 1-50 $\mu$m in average particle size.

At least part of a ceramic material, a catalyst material or a carrier material may be displaced by a precursor thereof which forms the ceramic material, catalyst material or carrier material, respectively, when heated. The precursor is, therefore, includes, for example, hydroxides, carbonates or nitrates. The precursor is used usually together with other ceramic material, and is used preferably as a solution so as to provide a uniform green mold togeher with the other ceramic materials. But the precursor may be used as it is. If desired, clay materials such as cordielite or mullite may also be used as a ceramic material.

The ceramic plastic composition used in the invention contains a polyalkylene glycol monoether selected from the group consisting of a diethylene glycol monoether and a triethylene glycol monoether. The polyalkylene glycol monoether controls the evaporation of water from a wet green mold in the water removal step to prevent the occurrence of structural distortion of the green mold during the water evaporating step, thereby to prevent cracking or desctruction of the mold.

Moreover, the polyalkylene glycol monoether has a higher vapor pressure than the aforesaid polyhydric alcohol, so that it is more readily evaporated from the wet mold by passing a heated air through the openings of the mold, and substantially no polyalkylene glycol monoether remains in the honeycomb structure after drying. As results, even when the honeycomb structure is calcined at high temperatures, no combustion of the polyalkylene glycol monoether takes place even in the presence of a catalyst material acting as an oxidation catalyst as before described.

The polyalkylene glycol monoether used has preferably an alkyl of 1-4 carbons such as methyl, ethyl or butyl. Therefore, preferred polyalkylene glycol monoethers used in the invention include, for example, diethylene glycol monomethyl ether, diethylene glycol monoethyl ether, diethylene glycol monobutyl ether, triethylene glycol monomethyl ether and triethylene glycol monoethyl ether. The polyalkylene glycol monoethyl ether may be used singly or as an admixture of two or more.

The ceramic plastic composition used in the invention contains the polyalkylene glycol monoether in specific amounts to water. Namely, the ceramic plastic composition contains water in amounts of about 85-50% by weight and the polyalkylene glycol monoether in amounts of about 15-50% by weight based on the total of the water and the polyalkylene glycol monoether, respectively.

Usually an aqueous solution of the polyalkylene glycol monoether in water, both in amounts as specified above, respectively, is prepared in advance, and the solution is added to a ceramic material together with the other components, if necessary, to prepare a ceramic plastic composition. However, the polyalkylene glycol monoether and water may be separately added to a ceramic material together with the other components.

When the amount of the polyalkylene glycol monoether is less than about 15% by weight based on the total of the water and the polyalkylene glycol monoether contained in the composition, the polyalkylene glycol monoether insufficiently controls or suppresses the evaporation of water from the wet green mold, so that the mold is distorted or becomes fissured during or after the water is evaporated from the wet green mold. However, when the amount of the polyalkylene glycol monoether is more than about 50% by weight based on the total of the water and the polyalkylene glycol monoether contained in the composition, the polyalkylene glycol monoether suppresses excessively the evaporation of water from the wet green mold, so that the water evaporates too slowly, and the productivity is infeasibly low. Furthermore, the mold might have cracks in the step of evaporating the polyalkylene glycol monoether since the evaporation of a large quantity of the polyalkylene glycol monoether brings about an excessive contraction of the mold. It might also happen that the polyalkylene glycol monoether remained in the mold, if in slight amounts, burns during the calcination step on account of catalytic oxidative action of catalyst materials contained in the mold. This might produce cracks in the resultant honeycomb structure but also deteriorate the activity of catalyst materials contained therein.

It is further preferred that the polyalkylene glycol monoether is contained in a ceramic plastic composition in amounts of about 5-30% by weight to 100 parts by weight of the ceramic material used. Similarly to the before described, when the amount of the polyalkylene glycol monoether is too small in relation to the ceramic material used, the polyalkylene glycol monoether insufficiently suppresses the evaporation of water from the wet green mold, so that the mold is distorted or becomes fissured during or after the water is evaporated from the wet green mold. However, when the amount of the polyalkylene glycol monoether is too large in relation to the ceramic material used, the polyalkylene glycol monoether suppresses excessively the evaporation of water from the green mold, so that the water evaporates too slowly, and the productivity is very low. Moreover, the mold might have cracks or be destroyed in the step of evaporating the polyalkylene glycol monoether, or the activity of catalyst material is deteriorated by the same reasons as described hereinbefore.

Any organic binder may be used in the invention which has been used heretofore in the production of ceramic honeycomb structures. Among others are preferably used, for example, a water soluble polymer such as methyl cellulose, polyethylene oxide, polyvinyl alcohol or starch glue. The organic binder is used usually in amounts of about 1-20 parts by weight, preferably in amounts of about 2-10 parts by weight, to 100 parts by weight of a ceramic material used.

The ceramic plastic composition may be provided by admixing and kneading the ceramic material with the polyalkylene glycol as described hereinbefore, water and an organic binder in a conventional manner. It is usually preferred that solid components are first wetted, and liquid components are added thereto and kneaded together. However, if desired, all the components are admixed together at a time and then kneaded.

In the second step, the resultant ceramic plastic composition is molded into a honeycomb structure by a conventional means such as a plunger extruder provided with honeycomb molding dies.

Then the resultant wet green mold is dried stepwise. At first, as the third step, an air which is controlled to have a relative humidity of about 90-70% is forcibly passed through the openings of the wet green mold to evaporate a substantial amount of the water contained in the wet mold.

In the method of the invention, the polyalkylene glycol monoether used has a relatively high vapor pressure, a small amount of thereof is inevitably evaporated together with the water in the third step. Therefore, more precisely, it is desired that the relative humidity of the air used is determined in accordance with the amount of the water and the polyalkylene glycol monoether in the wet mold. By way of example, when the wet mold contains water and a polyalkylene glycol monoether in the same amounts, the air used preferably has a relative humidity of about 75%, whereas when the wet mold contains water and a polyalkylene glycol monoether in amounts of 85% by weight and 15% by weight, respectively, based on the total of the water and the polyalkylene glycol monoether, the air used preferably has a relative humidity of about 80%.

The air used preferably has a temperature of about 10°-40° C., and is passed through the openings of the wet mold at a velocity of not less than about one meter per second in the openings. When the velocity of the air is smaller than about one meter per minute, the mold may be distorted in the direction of flow of the air as it is dried, so that the mold has cracks or is destroyed.

The honeycomb structure is then dried by evaporating the polyalkylene glycol monoether in the fourth step in which air heated to temperatures sufficient to evaporate the polyalkylene glycol monoether is forcibly passed through the openings of the honeycomb structure. The air used in the fourth step is heated in advance to a suitable temperature depending upon the individual polyalkylene glycol monoether used, however, it is usually in the range of about 60°-150° C.

When the temperature of the air is less than about 60° C., the polyalkylene glycol monoether evaporates infeasibly slowly and much time is needed to remove the polyalkylene glycol monoether completely from the mold.

Moreover, it is difficult to remove completely the polyalkylene glycol monoether from the honeycomb structure when a low temperature air is used, so that a relatively large amount of the polyalkylene glycol monoether used remains in the mold after drying. As a result, the remaining polyalkylene glycol monoether may also burn in the presence of catalyst materials used in the calcining step. When the temperature of the heated air is more than about 150° C., the polyalkylene glycol monoether, if only a small amount remain in the structure, may likewise burn in the calcining step.

The heated air is passed through the openings of the honeycomb structure preferably at a velocity of not less than about one meter per second in the openings also in the fourth step, similarly to the third step, since when the velocity of the air is smaller than about one meter per minute, the mold may be distorted in the direction of flow of the air as it is dried, so that the mold has cracks or is destroyed.

As set forth above, according to the invention, a wet honeycomb green mold is prepared by using a ceramic plastic composition which contains a polyalkylene glycol monoether threrein, and the structure is first dried by passing air of a specific relative humidity through the openings of a structure to evaporate the substantial amount of the water, and then by passing air of a specific temperature through the openings of the honeycomb structure to evaporate the polyalkylene glycol monoether therefrom, and then the structure is calcined, to produce a ceramic honeycomb structure.

In the invention, the polyalkylene glycol monoether makes it possible for the water to evaporate in a controlled manner in the third step, and the polyalkylene glycol monoether evaporates more readily, and no substantial amount thereof remains in the structure in the fourth step, so that when the structure is calcined at high temperatures, organic materials contained therein do not burn even in the presence of catalyst materials which act as an oxidation catalyst. Thus, according to the method of the invention, a high yield and productivity are achieved in industrial production of a large-sized ceramic honeycomb structure suitable for use as a catalyst structure or a carrier structure.

The invention will now be described with reference to examples, however, the invention is not limited thereto.

EXAMPLE 1

Production of a Ceramic Honeycomb Structure as a Catalyst Carrier

A mixture of 200 kg of titanium dioxide of 65 $m^2/g$ in specific surface area and 10 $\mu$m in average particle size, 15 kg of Kibushi clay of 45 $\mu$m in average particle size, 8 kg of methyl cellulose, 10 kg of ammonia water and 40 kg of water was mixed with a polyalkylene glycol monoether in amounts as shown in the Table 1.

In the Table 1, the polyalkylene glycol monoethers are designated by abbreviations:
DEGME: diethylene glycol monomethyl ether
DEGEE: diethylene glycol monoethyl ether
DEGBE: diethylene glycol monobutyl ether
TEGME: triethylene glycol monomethyl ether TEGEE: triethylene glycol monoethyl ether The resultant mixture was kneaded, extruded into a green honeycomb mold, dried under the conditions described in the Table 1, and calcined at a temperature of 450° C. for three hours, to provide a ceramic honeycomb structure as a carrier structure. The honeycomb structure was inspected as to whether it had cracks or was destroyed after the drying and calcining.

The results are shown in the Table 1, in which, A: no cracks were found; B: cracks were found, but all the cracks were not more one tenth times in length the longitudinal lenght of the honeycomb structure and not more than 0.1 mm in width; C: cracks were found which were either longer or wider than the cracks described in C; D: the honeycomb structure was destroyed.

REFERENCE EXAMPLE 1

A polyhydric alcohol was used in place of the polyalkylene glycol monoether, and otherwise in the same manner as in the Example 1, ceramic honeycomb structures as a catalyst carrier structure was produced.

In the Table 1, the polyhydric alcohols are designated by abbreviations: EG, ethylene glycol; and GL, glycerine.

The honeycomb structure was inspected as to whether it had cracks or was destroyed after the drying and calcining. The results are shown in the Table 1.

EXAMPLE 2

Production of a Ceramic Honeycomb Structure as a Catalyst Structure

A mixture of 200 kg of titanium dioxide of 65 m$^2$/g in specific surface area and 10 μm in average particle size, 15 kg of Kibushi clay of 45 μm in average particle size, 8 kg of methyl cellulose, 15 liters of an aqueous solution of vanadyl oxalate (150 g/l as $V_2O_5$ in concentration), 25 liters of ammonia water and 10 kg of water was mixed with a polyalkylene glycol monoether in amounts as shown in the Table 2.

The resultant mixture was kneaded, extruded into a green honeycomb mold, dried under the conditions shown in the Table 2, and calcined at a temperature of 450° C. for three hours, to provide a ceramic honeycomb structure as a catalyst structure. The honeycomb structure was inspected as to whether it had cracks or was destroyed after the drying and calcining. The results are shown in the Table 2.

REFERENCE EXAMPLE

A polyhydric alcohol was used in place of the polyalkylene glycol monoether, and otherwise in the same manner as in the Example 2, ceramic honeycomb structures as a catalyst structure were produced.

The honeycomb structure was inspected whether it had cracks or was destroyed after the drying and calcining. The results are shown in the Table 2.

TABLE 1

Example 1 and Reference Example 1

| | Polyalkylene Glycol Monoethers or Polyhydric Alcohols (Amounts Thereof in the Compositions) (kg) | Water (kg) | Drying Conditions | | | | | Results of Inspection of Honeycomb Structures After | |
|---|---|---|---|---|---|---|---|---|---|
| | | | The Third Step | | | The Fourth Step | | | |
| | | | Relative Humidity (%) | Temperature (°C.) | Velocity (m/sec.) | Temperature (°C.) | Velocity (m/sec.) | Drying | Calcining |
| Invention 1 | DEGME (50) | 50 | 70 | 20 | 2 | 110 | 2 | B | B |
| Invention 2 | DEGME (40) | 60 | 74 | 20 | 2 | 110 | 2 | A | A |
| Invention 3 | DEGME (20), DEGEE (20) | 60 | 76 | 20 | 2 | 115 | 2 | A | A |
| Reference 1 | DEGME (20), DEGEE (20) | 60 | 76 | 20 | 0.5 | 115 | 0.5 | B | B |
| Invention 4 | TEGME (35) | 65 | 78 | 20 | 1 | 120 | 1 | B | B |
| Invention 5 | TEGME (35) | 65 | 78 | 20 | 5 | 120 | 5 | A | A |
| Invention 6 | TEGEE (30) | 70 | 78 | 20 | 2 | 130 | 2 | B | B |
| Reference 2 | EG (30) | 70 | 73 | 20 | 2 | 110 | 2 | C | C |
| Reference 3 | TEGEE (30) | 70 | 50 | 20 | 2 | 130 | 2 | B | B |
| Invention 7 | DEGBE (50) | 50 | 75 | 20 | 2 | 120 | 2 | B | B |
| Reference 3 | DEGBE (70) | 30 | 75 | 20 | 2 | 120 | 2 | D | D |
| Invention 8 | DEGBE (30) | 70 | 75 | 20 | 2 | 120 | 2 | B | B | ing. The results are shown in the Table 2.

TABLE 2

Example 2 and Reference Example 2

| | Polyalkylene Glycol Monoethers or Polyhydric Alcohols (Amounts Thereof in the Compositions)[1] (kg) | Water (kg) | Drying Conditions | | | | | Results of Inspection of Honeycomb Structures After | |
|---|---|---|---|---|---|---|---|---|---|
| | | | The Third Step | | | The Fourth Step | | | |
| | | | Relative Humidity (%) | Temperature (°C.) | Velocity (m/sec.) | Temperature (°C.) | Velocity (m/sec.) | Drying | Calcining |
| Invention 9 | DEGME (40) | 60 | 73 | 20 | 2 | 100 | 2 | A | A |
| Reference 5 | DEGME (40) | 60 | 83 | 20 | 2 | 100 | 0.5 | C | D |
| Reference 6 | EG (40) | 60 | 73 | 20 | 2 | 100 | 0.5 | D | D |
| Invention 10 | DEGEE (30) | 70 | 75 | 20 | 2 | 100 | 2 | B | B |
| Reference 7 | GL (30) | 70 | 75 | 20 | 2 | 100 | 2 | C | C |
| Invention 11 | DEGME (20), DEGBE (20) | 60 | 72 | 20 | 5 | 100 | 2 | B | B |
| Invention 12 | DEGME (30), DEGEE (10) | 60 | 72 | 20 | 2 | 100 | 5 | A | A |
| Invention 13 | TEGME (40) | 60 | 75 | 20 | 5 | 90 | 5 | A | A |
| Invention 14 | TEGME (40) | 50 | 75 | 20 | 2 | 90 | 2 | B | B |
| Invention 15 | DEGME (50) | 50 | 72 | 20 | 5 | 90 | 5 | A | A |
| Reference 8 | DEGME (50) | 50 | 72 | 20 | 5 | 160 | 2 | A | C |

What is claimed is:

1. A method of producing ceramic honeycomb structures which comprises:
   (a) preparing a ceramic plastic composition which comprises admixing and kneading a ceramic material and an organic binder with water in amounts of about 85–50% by weight and a polyalkylene glycol monoether selected from the group consisting of diethylene glycol monoether and triethylene glycol monoether in amounts of about 15–50% by weight based on the total of the water and the polyalkylene glycol monoether, respectively;
   (b) extruding the ceramic plastic composition into a wet green mold of a honeycomb structure having openings extending therethrough;
   (c) passing air having a relative humidity of 90–70% and a temperature of about 10° to 40° C. through the openings at a velocity of not less than about one meter per second to evaporate a substantial amount of the water in the green mold;
   (d) passing air having a temperature of about 60°–150° C. through the openings at a velocity of not less than about one meter per second to evaporate the polyalkylene glycol monoether from the green mold to provide a dried mold; and
   (e) calcining the dried mold.

2. The method as claimed in claim 1 wherein the polyalkylene glycol monoether is at least one selected from the group consiting of diethylene glycol monomethyl ether, diethylene glycol monoethyl ether, diethylene glycol monobutyl ether, triethylene glycol monomethyl ether and triethylene glycol monoethyl ether.

3. The method as claimed in claim 1 wherein the polyalkylene glycol monoether is contained in the ceramic plastic composition in amounts of about 5–30 parts by weight to 100 parts by weight of the ceramic material.

4. The method as claimed in claim 1 wherein the composition contains a water soluble polymer as the organic binder in amounts of about 1–20 parts by weight in relation to 100 parts by weight of the ceramic material.

* * * * *